Patented Feb. 20, 1951

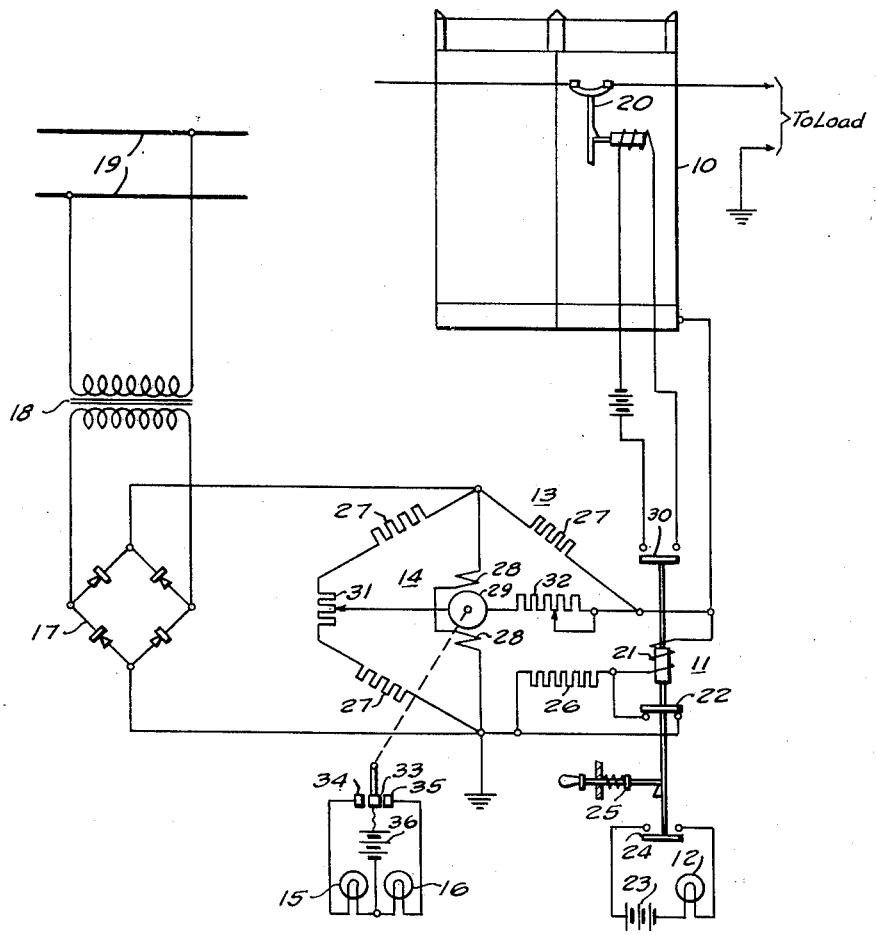

2,542,838

UNITED STATES PATENT OFFICE 2,542,838

GROUND PROTECTIVE SYSTEM

Maurice E. Reagan, Pittsburgh, Pa., assignor to Westinghouse Electric Corporation, East Pittsburgh, Pa., a corporation of Pennsylvania Application December 27, 1947, Serial No. 794,144

3 Claims. (Cl. 177—311)

My invention relates, generally, to ground protective systems and, more particularly, to systems for detecting grounds or faults on switchgear apparatus.

In certain classes of switchgear installations, where one side of the electrical circuit is grounded, it is the usual practice to insulate the switchgear supporting framework or housing from ground. One connection is made from the structure through a ground detector relay to ground. It is important to know at all times if this ground circuit is in proper working condition as there is no electrical connection except in case of a fault. Should the ground detector relay and its associated wiring become out of order, it is desirable to notify the operating personnel that the protective circuit is not in an operative condition.

An object of my invention, generally stated, is to provide a ground protective system which shall be simple and efficient in operation and which may be economically manufactured and installed.

A more specific object of my invention is to provide for continuously testing the condition of a ground detector system.

Another object of my invention is to provide for indicating the condition of a ground detector system.

A further object of my invention is to provide a self-indicating ground protective system.

Other objects of my invention will be explained fully hereinafter or will be apparent to those skilled in the art.

In accordance with one embodiment of my invention, the resistance of a ground detector relay circuit is continuously measured by a Wheatstone bridge to which a relay is so connected that one indication is given if the detector relay circuit becomes open and a different indication is given if the detector relay circuit becomes shorted.

For a better understanding of the nature and objects of my invention, reference may be had to the following detailed description, taken in conjunction with the accompanying drawing, in which the single figure is a diagrammatic view of a ground protective system embodying the principal features of my invention.

Referring now to the drawing, the system shown therein comprises a cubicle or metal enclosed switchgear unit 10, a ground or fault detector relay 11, an indicating lamp 12, a Wheatstone bridge 13, a relay 14 associated with the Wheatstone bridge 13, indicating lamps 15 and 16, a full wave rectifier 17, a transformer 18 and power conductors 19 to which the transformer 18 is connected. The cubicle 10 may be of the usual type utilized for housing switchgear apparatus such as, for example, a circuit breaker 20 and other apparatus utilized in substations for railway service.

In accordance with the usual practice, the cubicle 10 is insulated from ground and the ground detector relay 11 is provided to warn the operating personnel that a fault condition exists and the circuit breaker 20 is tripped to isolate the fault. As shown, the ground detector relay 11 is provided with an actuating coil 21, one terminal of which is connected to the housing of the cubicle 10 and the other terminal of which is normally connected to ground through contact members 22 of the relay. Thus, in case the power conductors within the cubicle should be connected, either by direct contact or through ionized gas, with the housing, the actuating coil 21 is energized to operate the relay. When the relay is operated, the indicating lamp 12 is connected across a battery 23 through contact members 24 on the relay, thereby indicating to the operating personnel that a fault condition exists in the cubicle 10. Also, the breaker 20 is tripped by the closing of contact members 30 on the relay 11.

As shown, the relay 11 may be provided with a latching mechanism 25 which requires that it be manually re-set after the fault condition is removed. When the contact members 22 of the relay are opened, a resistor 26 may, if needed, be inserted in the circuit for the actuating coil 21, to protect the coil against injury while the fault condition exists.

As explained hereinbefore, it is important to know at all times whether the ground detector relay and its circuit connections are in proper working order. Should the ground detector relay and its associated wiring become open or short-circuited, it is desirable to sound an alarm or otherwise indicate to the operating personnel that the protective circuit is not in an operative condition. In order to accomplish this result I provide for continuously measuring the resistance of the detector relay circuit and for indicating to the operating personnel when a material change in this resistance takes place. Should the supply voltage fail, the relay 14 will also indicate the fact that the circuit is not being supervised.

As shown, the actuating coil 21 and its wiring connections constitute one leg of the Wheatstone bridge circuit 13. The other legs of the Wheatstone bridge comprise fixed resistors 27. The power for operating the Wheatstone bridge may be supplied by the full wave rectifier 17 which is connected to the secondary winding of the transformer 18, the primary winding of which is energized from the alternating current conductors 19. Any reliable source of direct current may be utilized to energize the Wheatstone bridge.

The relay 14, which may be of the rotating armature type, is provided with field windings 28 which are connected across two terminals of the Wheatstone bridge or other suitable source of direct current and an armature winding 29 which is connected across the other two terminals of the bridge. Variable resistors 31 and 32 may be provided for so adjusting the Wheatstone bridge that under normal conditions a contact arm 33, which is actuated by the armature 29, is substantially midway between contact members 34 and 35 of the relay 14.

Thus, if the detector relay circuit becomes short-circuited, thereby decreasing the resistance of one leg of the Wheatstone bridge, the contact arm 33 moves in a direction to engage one of the contact members, for example 34, thereby connecting the indicating lamp 15 across a battery 36. If the connections for the detector relay 11 should become open-circuited, thereby increasing the resistance of one leg of the Wheatstone bridge, the contact arm 33 engages the contact member 35, thereby connecting the indicating lamp 16 across the battery 36.

In case of loss of power to the Wheatstone bridge, the lamp 16 would also be energized. In this manner the operating personnel is informed of the condition of the ground protective system and in case of trouble is informed of the nature of the trouble, that is, whether an open or a short-circuited condition exists. A resistance measuring circuit of a type other than a Wheatstone bridge may be utilized if desired.

From the foregoing description, it is apparent that I have provided a system for continuously testing the condition of a ground protective circuit and for indicating the nature of the trouble should the circuit become inoperative. While the system has been illustrated as applied to metal-enclosed switchgear, it is not necessarily limited thereto and may be utilized with electrical apparatus of other types.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a ground protective system, in combination, an apparatus unit, a ground detector relay having an actuating coil connected between said unit and ground, a resistor connected in series with said coil, contact members on the relay for shunting said resistor, a Wheatstone bridge circuit, said actuating coil and its circuit connections being connected in one leg of the Wheatstone bridge circuit, relay means connected across said bridge circuit to be responsive to variations in the resistance of the circuit for said actuating coil, said relay means having contact members directionally operable in accordance with the condition of the circuit for said actuating coil, indicating means energized through said contact members on said relay means for indicating the condition of the circuit for said actuating coil, and variable resistance means connected in series-circuit relation with said relay means for adjusting the position of said contact members.

2. In a protective system, in combination, a fault detector relay having an actuating coil and contact members thereon, circuit connections for the coil including a resistor connected in series with said coil, said resistor being shunted by said contact members when they are closed, a resistance measuring circuit including said coil said contact members and said resistors, relay means connected to said measuring circuit to be responsive to variations in the resistance of the circuit connections for the coil, and indicating means energized through said relay means for indicating the condition of the circuit connections for said coil.

3. In a protective system, in combination, a fault detector relay having an actuating coil and contact members thereon, circuit connections for the coil including a resistor connected in series with said coil, said resistor being shunted by said contact members when they are closed, a resistance measuring circuit including said coil said contact members and said resistor, relay means connected to said measuring circuit to be responsive to variations in the resistance of the circuit connections for the coil, said relay means having contact members directionally operable according to the condition of the circuit connections for said coil, and indicating means energized through said contact members on said relay means for indicating the condition of the circuit connections for said coil.

MAURICE E. REAGAN.

REFERENCES CITED

The following references are of record in the file of this patent:

UNITED STATES PATENTS

| Number | Name | Date |
|---|---|---|
| 2,390,813 | Sonnemann | Dec. 11, 1945 |
| 2,429,466 | Jones | Oct. 21, 1947 |